US009208549B2

(12) United States Patent
Stauder et al.

(10) Patent No.: US 9,208,549 B2
(45) Date of Patent: Dec. 8, 2015

(54) METHOD AND APPARATUS FOR COLOR TRANSFER BETWEEN IMAGES

(71) Applicant: THOMSON LICENSING, Issy de Moulineaux (FR)

(72) Inventors: Jurgen Stauder, Montreuil/Ille (FR); Hasan Sheikh Faridul, Cesson Sevigne (FR); Emmanuel Jolly, Rennes (FR)

(73) Assignee: Thomson Licensing SAS, Issy les Moulineux (FR)

( * ) Notice: Subject to any disclaimer, the term of this patent is extended or adjusted under 35 U.S.C. 154(b) by 48 days.

(21) Appl. No.: 14/099,587

(22) Filed: Dec. 6, 2013

(65) Prior Publication Data

US 2014/0161347 A1 Jun. 12, 2014

(30) Foreign Application Priority Data

Dec. 7, 2012 (EP) .................................... 12306537

(51) Int. Cl.
*G06K 9/00* (2006.01)
*G06K 9/40* (2006.01)
(Continued)

(52) U.S. Cl.
CPC ................ *G06T 5/50* (2013.01); *G06K 9/4652* (2013.01); *H04N 13/0025* (2013.01); *H04N 13/0037* (2013.01)

(58) Field of Classification Search
CPC .............. H04N 1/60; H04N 13/02203; H04N 13/0037; G06K 9/4652; G06K 9/00228; G06K 9/468; G06K 9/6203; G06K 9/6257; G06K 9/00234; G06K 9/00248; G06K 9/00261; G06K 9/00268; G06K 9/6204; G06K 9/6207; G06T 1/00; G06T 3/00
USPC ......... 382/162, 167, 254, 173, 154, 164, 274, 382/305, 118, 159, 181, 264, 263, 284, 382/294; 358/500, 518, 520, 515, 505, 504, 358/519, 405, 406, 443, 446, 448, 461, 506, 358/516, 530, 538; 348/E15.001, E5.041, 348/E5.046, E9.009; 345/593, 629, 589, 345/619, 648, 655, 590, 519, 592, 616, 604, 345/609
See application file for complete search history.

(56) References Cited

U.S. PATENT DOCUMENTS 4,060,829 A     11/1977   Sakamoto
5,883,632 A *   3/1999   Dillinger ....................... 345/589
(Continued)

FOREIGN PATENT DOCUMENTS

CN              101820550           9/2010

OTHER PUBLICATIONS

Radke R et al_Efficiently estimating projective transformation_Intl Conference IEEE_Sep. 10, 2000; vol. 1, pp. 232-235.
(Continued)

*Primary Examiner* — Sheela C Chawan
(74) *Attorney, Agent, or Firm* — Volpe and Koenig, P.C.

(57) ABSTRACT

A method and an arrangement for color transfer between images for compensating color differences between at least two images as a first and a second image represented by pixel data are recommended, wherein for corresponding feature points of the images a color map and a geometric map are calculated for compensating a first image by applying said geometric map and said color map to the first image resulting in a compensated first image for detecting regions where a compensation fails by comparing the compensated first image with the second image to perform a color transfer excluding image regions where the compensation failed. The method can be performed on the fly and is applicable for equalizing color differences between images different in geometry and color.

16 Claims, 2 Drawing Sheets

Figure 1:
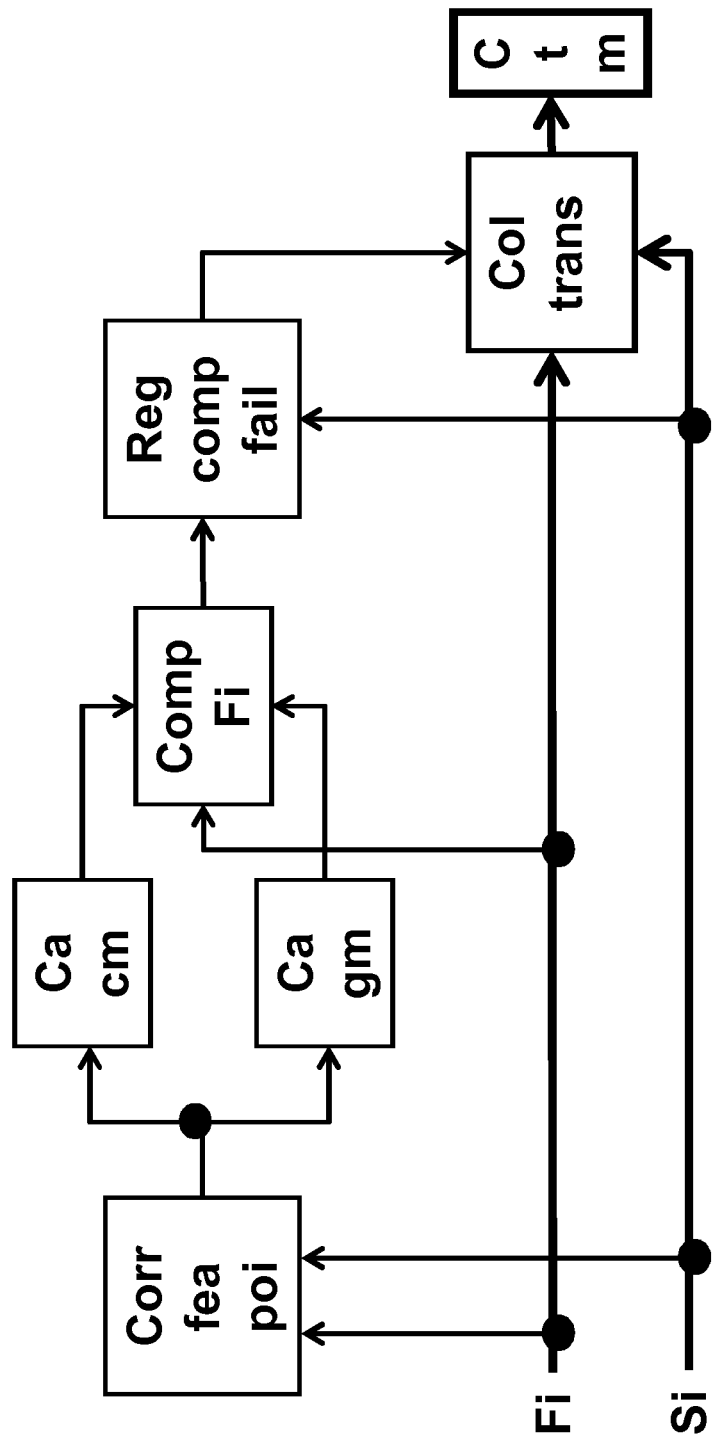

(51) Int. Cl.
*G09G 5/02* (2006.01)
*G03F 3/08* (2006.01)
*G06T 5/50* (2006.01)
*H04N 13/00* (2006.01)
*G06K 9/46* (2006.01)

(56) References Cited

U.S. PATENT DOCUMENTS

| | | | |
|---|---|---|---|
| 7,317,843 B2* | 1/2008 | Sun et al. | 382/274 |
| 7,463,296 B2* | 12/2008 | Sun et al. | 348/254 |
| 7,508,545 B2* | 3/2009 | Ng et al. | 358/1.9 |
| 7,532,752 B2* | 5/2009 | Wen et al. | 382/162 |
| 7,796,812 B2* | 9/2010 | Pitie et al. | 382/162 |
| 7,925,117 B2* | 4/2011 | Hamza et al. | 382/294 |
| 8,031,202 B2* | 10/2011 | Perronnin | 345/594 |
| 8,553,045 B2* | 10/2013 | Skaff et al. | 345/593 |
| 8,976,191 B1* | 3/2015 | Mendez Mendez | 345/589 |
| 2008/0284982 A1 | 11/2008 | Richards et al. | |
| 2010/0027881 A1 | 2/2010 | Kim et al. | |
| 2011/0267430 A1 | 11/2011 | Sakano et al. | |
| 2012/0133733 A1 | 5/2012 | Sakaniwa et al. | |
| 2012/0140026 A1 | 6/2012 | Cheng et al. | |
| 2013/0002810 A1* | 1/2013 | Stauder et al. | 348/42 |

OTHER PUBLICATIONS

Reinhard_Color transfer between images_IEEE Computer Graphics and Applications_Oct. 4, 2001; vol. 21, No. 4, p. 34.
Hassan Sheikh Faridul et al_Optimization of Sparse Color CorrespondencesEngineering Systems Conference_Los Angeles_Nov. 12, 2012, vol. 19, pp. 128-134.
Search Report dated Apr. 2, 2013.
Hasan et al., "Robust Color Correction for Stereo", 2011 Conference for Visual Media Production (CVMP), London, England, Nov. 16, 2011, pp. 101-108.
Han et al., "Automatic Illumination and Color Compensation Using Mean Shift and Sigma Filter", IEEE Transactions on Consumer Electronics, vol. 55, No. 3, Aug. 2009, pp. 978-986.
Pouli et al., "Progressive color transfer for images of arbitrary dynamic range", Computers &Graphics, vol. 35, Nov. 11, 2010, pp. 67-80.
Weise et al., "Fast 3D Scanning with Automatic Motion Compensation", 2007 IEEE Conference on Computer Vision and Pattern Recognition (CVPR), Jun. 17, 2007, pp. 1-8.
Maslennikova et al., "Interactive Local Color Transfer Between Images", GraphiCon 2007, Moscow, Russia, Jun. 23, 2007, pp. 1-4.
Lowe, D., "Distinctive image features from scale invariant keypoints", International Journal of Computer Vision, vol. 60, No. 2, Jan. 5, 2004, pp. 91-110.
Fecker et al., "Histogram-based prefiltering for luminance and chrominance compensation of multiview video", IEEE Transactions on Circuits and Systems for Video Technology, vol. 18, No. 9, Sep. 2009, pp. 1258-1267.
Yao et al., "Color Transfer Via Local Binary Patterns Mapping", Proceedings of 2010 IEEE 17th International Conference on Image Processing (ICIP 2010), Hong Kong, Sep. 26, 2010, pp. 1825-1828.
Wang et al., "A Robust Algorithm for Color Correction Between Two Stereo Images", 9th Asian Conference on Computer Vision—ACCV 2009, Xian, China, Sep. 23, 2009, LNCS 5995, pp. 405-416.
Chiou et al., "Region-Based Color Transfer From Multi-Reference With Graph-Theoretic Region Correspondence Estimation", Proceedings of the 2009 16th IEEE International Conference on Image Processing (ICIP 2009), Cairo, Egypt, Nov. 7, 2009, pp. 501-504.
Luo et al., "Research of Mosaicing Low Overlapping Images Based on Feature and Color Transfer", 2009 4th IEEE Conference on Industrial Electronics and Applications (ICIEA), Xian, China, May 25, 2009, pp. 3769-3774.
Wang et al., "A Novel Automatic Color Transfer Algorithm Between Images", Journal of the Chinese Institute of Engineers, vol. 29, No. 6, Oct. 2006, pp. 1051-1060.
Pitie et al., "Automated colour grading using colour distribution transfer", Journal of Computer Vision and Image Understanding, vol. 107, No. 1-2, Jul. 2007, pp. 123-137.

* cited by examiner

METHOD AND APPARATUS FOR COLOR TRANSFER BETWEEN IMAGES

This application claims the benefit, under 35 U.S.C. §119 of European Patent Application 12306537.7, filed Dec. 7, 2012.

The invention relates to a method and an apparatus for color transfer between images as e.g. images of two cameras providing images slightly different in geometry and color.

BACKGROUND

In video processing for stereo or 3D reproduction, one issue is the color difference between two or more views of the same scene as 3D video content is often created from two or more captured 2D videos. These differences may result for example from physical light effects or from cameras being not complete identical as e.g. each camera has its own lens, sensors and further specific behavior. Especially in case of 3D reproduction, it leads to disturbing effects that both pictures have a slightly different color which may cause pain in the head of the viewers.

Furthermore, there are several technical aspects for which calibrated colors of stereo images are desired as a compensation of color differences e.g. reduces the required bitrate, allows a more precise disparity estimation to create or enhance 3D information or 2D images using 3D information for view interpolation or a detection of hidden objects.

Known methods for compensating color differences between input images can be divided into two groups: color mapping and color transfer. Usually, two images are processed and the goal is to describe the color transformation that allows transforming colors of one image into the colors of the other image of the same scene.

In color mapping, it is assumed that geometrically correspondences—so-called feature correspondences between the input images are available. A well-known method for feature correspondences is Scale Invariant Feature Transform, so-called SIFT. It detects corresponding feature points using a descriptor based on a Difference of Gaussian, so-called DoG, in the input images. Geometrical correspondences are often not available in images or parts of images that are low textured, for example sky, surfaces of man-made, uni-colored images.

In color transfer, geometrical correspondences are not used and images are not required to be textured. There is a case where precise geometrical correspondences are not meaningful because the two input images do not show the same semantic scene but are just semantically close. According to a well-known color transfer algorithm, first and second order image signal statics are transferred from a reference image to the corresponding target image. In order to be able to process color channels separately, an empirical, de-correlated color space is used.

That means, when applying a known color mapping algorithm, if the image content in a part of the image does not correspond to the selection criteria of the SIFT algorithm, no colors from this part of the image will be exploited. This is the case, for example, in low textured parts of an image.

And, when applying a color transfer method to images that show the same semantic scene, the precision of the calculated color transform will suffer from the presence of image regions that have no correspondence in the other image, respectively, as e.g. image statistics will be influenced by such regions. This is the case or example for stereo images where parts at the left border of the left image may not be visible in the right image and vice versa. Another example is images from a motion picture scene where the camera motion is travelling type. Here, in each image, a small part of the scene is not any longer visible and another small part of the scene becomes visible but has not been before.

SUMMARY OF THE INVENTION

It is an aspect of the invention to provide a color transfer for compensating color differences between at least two images although cropping from one to another image is present, there are image-regions that are covered or uncovered by parallax effect or image-regions are covered or uncovered by moving objects or moving camera. This problem is solved by a method and an apparatus disclosed in independent claims. Advantageous additional embodiments of the invention are disclosed in respective dependent claims.

According to the invention, the contradiction is solve, that color mapping suffers from the problem that no colors from a part of an image will be exploited where the image has no geometrically correspondences in the other image, so that the image does not correspond to the selection criteria of the SIFT algorithm and color transfer suffers from the problem that geometrical correspondences are not much meaningful if two input images do not show exactly the same semantic scene but are just semantically close and geometrical correspondences are not available.

Therefore, it is an aspect of the invention to detect regions of a first image where a geometrical compensation fails by comparing said first image to a second geometrically compensated image and applying a color transfer method to both images while excluding image regions where the compensation failed. That means in other words that it is recommended to detect regions of a second image where a geometrical compensation fails by comparing said second image to a first geometrically compensated image and applying a color transfer method to both images in the course of excluding image regions where the geometrical compensation failed.

According to a method of the invention, it is taken advantage of a Scale Invariant Feature Transformation of said at least two images
providing a set of corresponding feature points,
calculating a color mapping model capable to map colors of the feature points in said first image to the colors of the corresponding feature points in said second image,
calculating a geometric mapping model capable to map image positions of feature points in said first image to the image positions of the corresponding feature points in said second image,
compensating the first image using said geometric mapping model and said color mapping model resulting in a compensated first image,
detecting regions where a compensation fails by comparing said second image to said compensated first image and
applying a color transfer method to the first and second image excluding image regions where the compensation failed.

That means that the contradiction, that on the one side color mapping suffers from the problem that no colors from a part of an image will be exploited where the image has no geometrically correspondences in the other image, and on the other side color transfer suffers from the problem that geometrical correspondences are not meaningful if two input images do not show the same semantic scene but are just semantically close is solved by a suited combination of geometric and color transfer step which without a prime calibration pattern can be performed on the fly.

The method is realized by a corresponding apparatus, where data representing a first and a second image are applied to a processor for calculating a color mapping model to map colors of said first image to colors of the second image, for calculating a geometric mapping model to map image positions of said first image to image positions of corresponding feature points in said second image, for compensating the first image using said geometric mapping and said color mapping model resulting in a compensated image, for detecting regions where the compensation fails by comparing said second image to said compensated first image and for applying a color transfer method to the two images except image regions where the compensation failed. According to a further embodiment of the invention, the regions where the compensation fails are detected by comparing said first image to the compensated second image.

Advantages of the invention are that all parts of the image are exploited while being robust against cropping, uncovered regions, covered regions and moving objects.

In principle, the invention is suited for equalizing color differences which is helpful for a series of applications. For example, when a stereo video sequence is compressed, compensation of color differences between left and right images can reduce the resulting bitrate. Another example is the 3D analysis of stereo sequences. When color differences are compensated, disparity estimation can be more precise. Another example is 3D assets creation for visual effects in post-production. When color differences in a multi-view sequence are compensated, extracted texture for 3D objects will have improved color coherence.

BRIEF DESCRIPTION OF PREFERRED EMBODIMENTS

Figure 2:
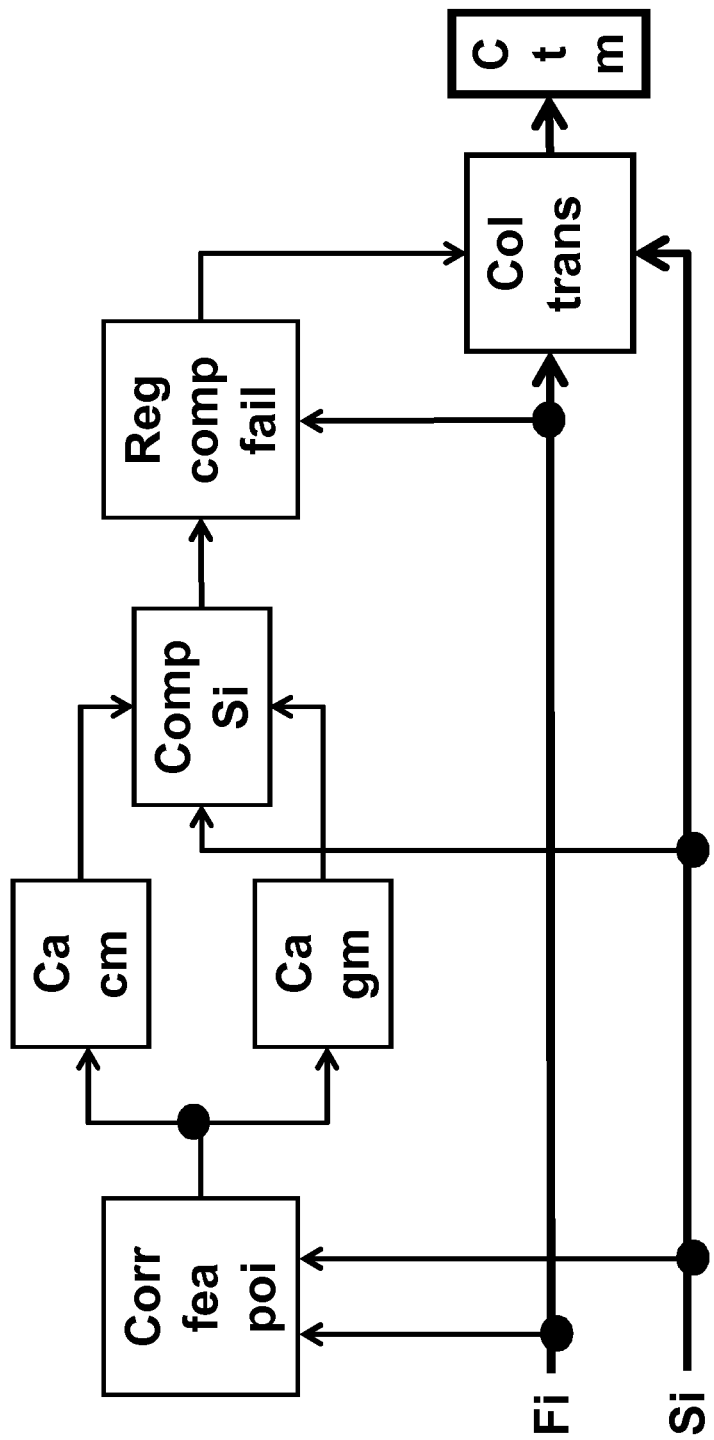

Exemplary embodiments of the invention are described with reference to the accompanying drawings, which show in:

FIG. 1 a block diagram illustrating the method and a first embodiment of color transfer for compensating color differences between at least two images and FIG. 2 a block diagram illustrating the method and a second embodiment of color transfer for compensating color differences between at least two images.

DETAILED DESCRIPTION OF PREFERRED EMBODIMENTS

Like numerals and characters designate like elements throughout the figures of the drawings.

Reference is initially directed to FIG. 1, which generally illustrates in a block diagram the basic blocks similar to a flow diagram illustrating the method which may include modules, circuits or devices that can be executed as software or hardware as a first embodiment of color transfer for compensating color differences between at least two images. FIG. 1 illustrates that in a first step corresponding feature points Corrfeapoi are calculated from a first image Fi and a second image Si for a color transfer between the first image Fi and the second image Si for compensating color differences between at least said two images. This can e.g. be performed by applying a so-called SIFT algorithm as it is well known and e.g. has been disclosed by Hasan Sheikh Faridul et al., Optimization of Sparse Color Correspondences for Color Mapping, Color and Imaging Conference, Nov. 12-Nov. 16, 2012, Los Angeles. In a second step, a color mapping method based on gain, offset and gamma and a projective geometric mapping model are applied in parallel to feature point correspondences provided by said calculation of corresponding feature points Corrfeapoi.

Color mapping methods based on gain, offset and gamma are well known and for an experimental embodiment a so-called GOG has been used and estimated from the corresponding feature points as disclosed by Hasan Sheikh Faridul et al. GOG represents the abbreviation for Gain, Offset and Gamma as used for a calculation of a color map Cacm of said corresponding feature points Corrfeapoi.

The well-known projective geometric mapping model is chosen for a calculation of a geometric map Cagm of said corresponding feature points Corrfeapoi. Six parameters are estimated from feature point correspondences using an iterative optimization procedure as e.g. published by Richard J. Radke et al., Efficiently Estimating Projective Transformations, in the Proceedings of the IEEE International Conference on Image Processing, Vancouver, Canada, September 2000.

According to a first embodiment illustrated in FIG. 1, the first image Fi is compensated to a compensated first image CompFi by a calculation of a color map Cacm as mentioned above and then the first image Fi is geometrically mapped using a projective mapping model. For each pixel of the second image, the corresponding geometric position in the first image is determined using the projective mapping model. The corresponding geometric position is usually not the position of a pixel of the first image but is an intermediate position inbetween the integer positions of the pixels. A trilinear interpolation is used to relate to the integer pixel positions. Trilinear interpolation is a method of multivariate interpolation on a regular grid. It approximates the color coordinates of the intermediate position within a local triangle of three integer pixel positions linearly, using the color coordinates of the integer grid of pixels. In well-known trilinear interpolation, barycentric coordinates are calculated that provide straight forward the interpolated color coordinates of the intermediate position. In a following step for detecting regions with compensation failure Regcompfail, the compensated first image CompFi is analysed for regions where the compensation fails. This step is performed by calculating pixel-wise absolute difference between the second image Si and said compensated first image CompFi and applying a predetermined threshold to said absolute differences in order to detect pixels having a compensation failure. In addition, morphological blowing and shrinking operators, respectively, are applied to obtain smoothly shaped image regions with a compensation failure. Finally, a color transfer method as e.g. disclosed by E. Reinhard, M. Ashikhmin, B. Gooch, P. Shirley, Color Transfer between Images, in IEEE Computer Graphics and Applications, special issue on Applied Perception, Vol. 21, No. 5, pp 34-41, September-October 2001 is used while excluding image regions of compensation failure from calculation for color transfer. Therefore, pixel data of the first image Fi, pixel data of the second image Si and the result of said detecting regions with compensation failure Regcompfail are combined in a color transfer Coltrans block by applying a color transfer method as e.g. mentioned above for providing a color transfer model Ctm. Said pixel data of an image which represent an image are in general provided as image files, so that they can be used for calculating corresponding feature points Corrfeapoi and applying a color transfer method.

A second embodiment of the invention is illustrated in FIG. 2 where the principle inherent in the method is realized by generating a compensated second image CompSI for detecting regions with compensation failure Regcompfail. The compensated second image CompSI is generated by calculation means for calculating corresponding feature points Corrfeapoi from pixel data of the first image Fi and the second image Si and calculation means for a calculation of a color map Cacm and a calculation of a geometric map Cagm of said corresponding feature points Corrfeapoi which in the means for providing the compensated second image CompSI are combined with the pixel data of the second image Si for providing data of a compensated second image CompSI. The data of the compensated second image CompSI are applied to a calculating means for detecting regions with compensation failure Regcompfail to which therefore also the pixel data of the first image Fi are applied. Finally, a color transfer Coltrans block is connected with the output of the means for detecting regions with compensation failure Regcompfail for a color transfer between pixel data of the first image Fi and pixel data of the second image Si as e.g. images of two cameras providing images slightly different in geometry and color. A color transfer model Ctm is then provided at the output of the color transfer Coltrans block applying a color transfer method to the first image Fi and the second image Si by taking into account regions with compensation failure.

In case that color transfer between more than two images—i.e. an n-tuple of images—shall be performed the first n−1 images are compensated to n−1 compensated images by a calculation of n−1 color maps as mentioned above and then the first n−1 images are geometrically mapped using n−1 projective mapping models. For each pixel of each of the last image, the corresponding geometric position in the first n−1 images is determined using the projective mapping models and a trilinear interpolation as described. In a following step for detecting regions with compensation failure, the compensated first n−1 images are analysed for regions where the compensation fails, such as described. Finally, n−1 color transfer methods are used to transfer colors from each of the n−1 first images to the last image, respectively, such as described above.

In case of several first images and several second images the method shall be performed in the following way. First, the several first images are combined—for example by patching them together—into a new, larger first image. Second, the several second images are combined—for example by patching them together—into a new, larger second image. Then, the invented method is applied to the new first image and the new second image.

Advantageously, according to the recommended color transfer all parts of the images are exploited, so that the method is robust against cropping, uncovered regions, covered regions and moving objects. Furthermore, color calibration can be performed without a prime calibration pattern and can be performed on the fly.

As shown in FIG. 1 and FIG. 2, the blocks in the diagrams may include modules, circuits or devices that can be executed as software or hardware. According to a further embodiment of the invention an image processor is provided to execute one of the methods illustrated above.

The invention is applicable for equalizing color differences between images different in geometry and color which is e.g. helpful to reduce the resulting bitrate for transferring data or data compression or a precise disparity estimation in 3D applications as well as an improved color coherence of textures of 3D objects.

Although the invention has been shown and described with respect to two specific embodiments thereof, it should be understood by those skilled in the art that the foregoing and various other changes, omissions and additions in the form and detail thereof may be made therein without departing from the spirit and scope of the claims.

The invention claimed is:

1. A method for color transfer between images for compensating color differences between at least two images represented by pixel data, the method comprising:
   generating corresponding feature points from said at least two images;
   calculating a color map capable of mapping colors of the feature points in a first image to the colors of the corresponding feature points in a second image of said at least two images;
   calculating a geometric map capable of mapping image positions of feature points in said first image to image positions of the corresponding feature points in said second image;
   compensating the first image using said geometric map and said color map, resulting in a compensated first image, or compensating the second image using said geometric map and said color map, resulting in a compensated second image;
   detecting regions where a compensation fails by comparing said second image to said compensated first image or detecting regions where a compensation fails by comparing said first image to said compensated second image; and
   applying a color transfer method to the first and second image excluding image regions where the compensation failed.

2. The method according to claim 1, wherein the corresponding feature points of the images are generated by a Scale Invariant Feature Transformation based on a Difference of Gaussian in the input images as at least the first image and the second image.

3. The method according to claim 1, wherein the color map is calculated by a applying a color mapping method to the corresponding feature points based on gain, offset and gamma.

4. The method according to claim 1, wherein the geometric map is calculated by an iterative optimization procedure of a projective geometric mapping model.

5. The method according to claim 1, wherein the first image is compensated to generate a compensated first image by a calculation of a color map and then the first image is geometrically mapped using a projective mapping model.

6. The method according to claim 1, wherein the second image is compensated to generate a compensated second image by a calculation of a color map and then the second image is geometrically mapped using a projective mapping model.

7. The method according to claim 1, wherein the detection of regions where the compensation failed failure is performed by calculating pixel-wise absolute difference between the second image and said compensated first image or by calculating pixel-wise absolute difference between the first image and said compensated second image and applying a predetermined threshold to said absolute differences in order to detect pixels having a compensation failure.

8. The method according to claim 1, wherein the color transfer method excluding image regions where the compensation failed is applied to the first and second image for providing a color-transfer-model.

9. An apparatus for color transfer between images for compensating color differences between at least two images represented by pixel data, the apparatus comprising an image processor configured to:
   generate corresponding feature points from said at least two images;
   calculate a color map capable to map colors of the feature points in a first image to the colors of the corresponding feature points in a second image of said at least two images;

calculate a geometric map capable to map image positions of feature points in said first image to the image positions of the corresponding feature points in said second image;

compensate the first image using said geometric map and said color map resulting in a compensated first image or compensating the second image using said geometric map and said color map resulting in a compensated second image;

detect regions where a compensation fails by comparing said second image to said compensated first image or detecting regions where a compensation fails by comparing said first image to said compensated second image; and apply a color transfer method to the first and second image excluding image regions where the compensation failed.

10. The apparatus according to claim 9, wherein the image processor is configured to generate the corresponding feature points of the images by a Scale Invariant Feature Transformation based on a Difference of Gaussian in the input images as at least the first image and the second image.

11. The apparatus according to claim 9, wherein the image processor is configured to calculate the color map by a applying a color mapping method to the corresponding feature points based on gain, offset and gamma.

12. The apparatus according to claim 9, wherein the image processor is configured to calculate the geometric map by an iterative optimization procedure of a projective geometric mapping model.

13. The apparatus according to claim 9, wherein the image processor is configured to compensate the first image to generate a compensated first image by a calculation of a color map and to then geometrically map the first image using a projective mapping model.

14. The apparatus according to claim 9, wherein the image processor is configured to compensate the second image to generate a compensated second image by a calculation of a color map and to then geometrically map the second image using a projective mapping model.

15. The apparatus according to claim 9, wherein the image processor is configured to perform the detection of regions where the compensation failed by calculating pixel-wise absolute difference between the second image and said compensated first image or by calculating pixel-wise absolute difference between the first image and said compensated second image and applying a predetermined threshold to said absolute differences in order to detect pixels having a compensation failure.

16. The apparatus according to claim 9, wherein the image processor is configured to apply the color transfer method excluding image regions where the compensation failed to the first and second image for providing a color-transfer-model.

* * * * *